Figure 1:
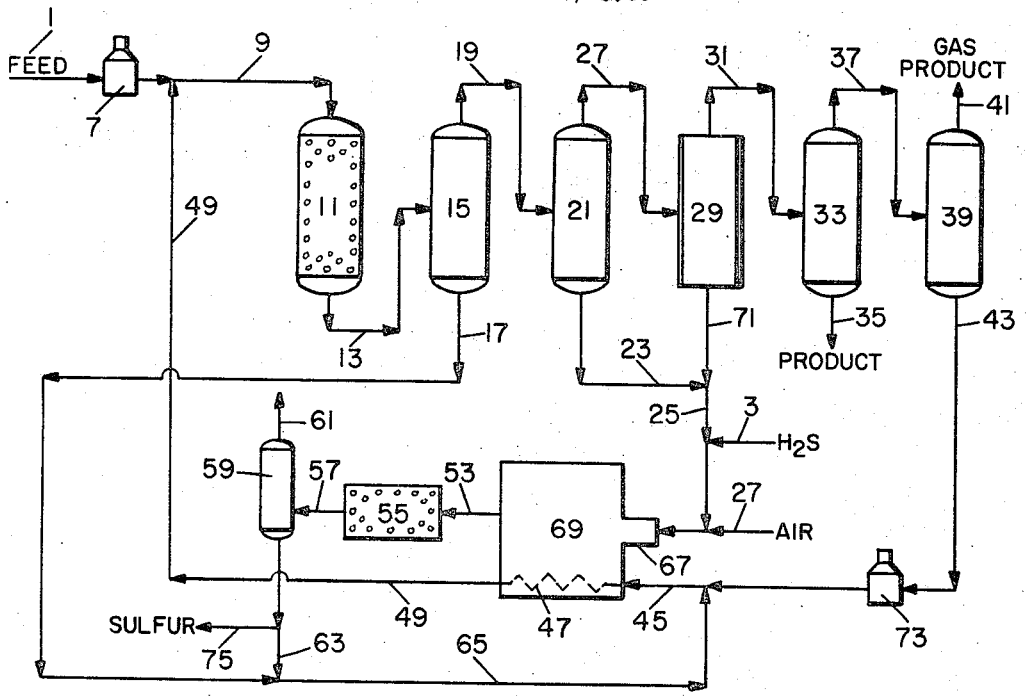

Sept. 26, 1967  S. C. SCHUMAN  3,344,201
PRODUCTION OF STYRENE
Filed June 7, 1965

INVENTOR
SEYMOUR C. SCHUMAN 3,344,201
PRODUCTION OF STYRENE
Seymour C. Schuman, Rocky Hill, N.J.
(360 Jefferson Road, Princeton, N.J. 08540)
Filed June 7, 1965, Ser. No. 461,764
20 Claims. (Cl. 260—669)

This invention relates to the conversion of ethyl benzene using elemental sulfur as a primary reactant to produce styrene.

As is well known, styrene is an important petrochemical intermediate for the production of synthetic rubber and of polystyrene plastics. Styrene is presently produced by the dehydrogenation of ethyl benzene (Hydrocarbon Processing and Petroleum Refiner, November 1963, vol. 42, No. 11, p. 220). However, as conventionally produced, such styrene is relatively expensive, primarily due to fundamental difficulties in the dehydrogenation step which modern proces technology has only partially been able to cope with and solve. The difficulties ultimately stem from the thermodynamics and energy relationships involved.

The thermodynamics of producing styrene from ethyl benzene by simple dehydrogenation, i.e.

$$C_6H_5 \cdot C_2H_5 \rightarrow C_6H_5 \cdot C_2H_3 + H_2 \qquad (1)$$

is calculable from the data of Rossini and has been discussed by several authors including Kearby (Catalysts, vol. III, Catalytic Dehydrogenation, Chapter 10, Kearby, K. K., pp. 453–491, Rheinhold Publishing Corp., 1955). The thermodynamic data are shown in Table A (Kearby, p. 471). These data show that to give practical yields of styrene from ethyl benzene by simple dehydrogenation (1) a temperature of 1100° F. is preferably employed, (2) sub-atmospheric pressures are highly desirable, (3) ethyl benzene must probably be recycled to improve styrene yields, (4) reaction heat requirements are 515 B.t.u. per pound of styrene produced.

Based on such thermodynamic requirements, processes have been developed to produce styrene from ethyl benzene as cited above. The processes operate at temperatures between 1100° F. and 1200° F. requiring special reactor construction. As required by the thermodynamic data, high steam dilutions are employed, both to supply the required endothermic heat, and to reduce the partial pressure of the reactants to obtain sufficiently high conversion. However, even with the use of high steam dilutions and relatively high reactor temperatures, only 34–40% conversion per pass is obtained so that large quantities of unreacted ethyl benzene must be fractionated from the styrene product and recycled to the reactor. Ultimately, the simple dehydrogenation process is able to produce a total yield of styrene from ethyl benzene of about 90%; however, among the other products produced are benzene, toluene, and tarry materials which must be separated from the styrene product using expensive, precise fractionation equipment. For all of these reasons, the present cost of styrene is relatively high which has prevented its broad use as a monomer for the production of plastics to the extent of the much less expensive monomeric materials such as ethylene and vinyl chloride.

I have found that the conversion of ethyl benzene to styrene can be carried out with a great improvement over the simple dehydrogenation process by using elemental sulfur in accordance with the following reaction $$C_6H_5 \cdot C_2H_5 + \tfrac{1}{2}S_2 \rightarrow C_6H_5 \cdot C_2H_3 + H_2S \qquad (2)$$

(For simplicity, here and elsewhere, I have used the formula $S_2$ for elemental sulfur, although it is well known to those skilled in the art that elemental sulfur may exist as $S_6$, $S_8$, and the like). When the hydrogen sulfide obtained from the sulfoxidation reaction is reconverted to elemental sulfur by the additional reaction.

$$H_2S + \tfrac{1}{2}O_2 \rightarrow \tfrac{1}{2}S_2 + H_2O \qquad (3)$$

and the reactions summed, it may be seen that the overall reaction $$C_6H_5 \cdot C_2H_5 + \tfrac{1}{2}O_2 \rightarrow C_6H_5 \cdot C_2H_3 + H_2O \qquad (4)$$

is analogous to a reaction proposed for other uses commonly designated as oxidative dehydrogenation. Thus, in this case my process may be considered to be a device in which, using elemental sulfur, oxidative dehydrogenation may be carried out more effectively. For convenience of reference, the first step involving elemental sulfur is herein called the sulfoxidation step or reaction. The second step involving the reconversion of hydrogen sulfide to elemental sulfur is conveniently designated as the reconversion step or reaction. As will be discussed below, the sulfoxidation reaction is slightly endothermic, whereas the reconversion reaction is exothermic. When both steps are employed concomitantly, the overall heat effect is mildly exothermic. As is obvious from the equations above, when both steps are employed, there is theoretically no consumption of elemental sulfur in the overall process.

Table A provides thermodynamic data for the sulfoxidation reaction. There is no need to utilize high temperatures, low pressures, and high ethyl benzene recycle rates as in the simple dehydrogenation, since sulfoxidation can be theoretically carried out with very high single pass yelds at temperatures as low as 700° F. or even lower, and at atmospheric pressure. By employing such moderate temperatures, yields are increased due to diminished losses from undesired reactions and long-on-stream periods can be obtained before the need for regeneration to burn off coke. A further highly desirable feature is the fact that the sulfoxidation reaction is mildly endothermic, with a heat requirement of only 145 B.t.u. per pound of styrene, compared to a requirement of 515 B.t.u. per pound for the simple dehydrogenation. The consequence of the relatively small heat requirement for sulfoxidation is that the heat required may be readily obtained by preheating the feed to suitable temperatures with little or no cracking, and the reaction then carried out adiabatically. Equally as importantly, the adiabatic reaction may be completed to high single pass conversions, with only a moderate decline in temperature from the inlet to the outlet of the reactor, permitting an ultimately greater selectivity to be attained, since the reaction temperature can be more closely held to that which is optimum.

In contrast with the work of McCullough (U.S. Patent 2,392,289), the process of my invention utilizes various metallic sulfides, prepared as will be described, as catalysts. These catalysts make it possible to operate at temperatures of 600° F. to 1100° F., and preferably at temperatures of between 700° F. to 1000° F., instead of temperatures of 1100–1450° F. employed by McCullough.

The sulfides of molybdenum, vanadium, chromium, tungsten, cobalt and nickel are preferred active catalytic components for this invention. However, many other sulfides in periodic groups IVA, IVB, VA, VB, VIA, VIIA, and VIII will similarly be active, as well as the sulfides of numerous of the rare earth metals with atomic numbers between 59 and 72. Typical active metals in each of these groups are Ce(IVA), Zn(IVB), Ta(VA), Bi(VB), U(VIA), Mn(VIIA), and Ru(VIII) as well as rare earths such as Dy.

Suitably prepared mixtures of more than one of the above sulfides may be more active than the separate components individually. For example, it is well known that mixtures containing both cobalt and molybdenum are more active than the separate components. Nickel and tungsten seem similarly to enhance the activity of each other. The reason for such co-promotion is not generally known.

Catalysts used in this invention may be in admixture or in combination with relatively inert materials such as, for example, activated alumina, silica gel, magnesia gel, activated clays, alumina gel, zirconia gel, activated bauxites, synthetic alumina silicates, and the like. The use of such "supports" to enhance the activity of metals and metal compounds is common practice. It is presumed that such supports disperse active metals and metal compounds in such a way so as to make them more available to reactants. Even inert materials with little extended surface such as carborundum, carbon black, alundum, pumice and the like are of value to extend the availability of active catalytic components. These materials are particularly important in this invention when the active catalytic component is of high cost, such as when Pt, Ce or Ru is employed.

Promotion with alkali compounds particularly those of potassium and secondarily those of sodium, lithium and rubidium may be employed. In this case the alkali compound ultimately comprises not more than 5% and preferably between 1% and 2% by weight of the catalyst. In some cases alkali phosphates have been found to be especially effective promoters.

The catalyst may be prepared by any of the methods known to those skilled in the art. This includes mixing dry powders, pasting dry powders, impregnating or precipitating active components onto the support, or in some cases, co-precipitating all of the catalyst components simultaneously. The catalyst components are in most cases then pelleted, extruded, spheroidized or otherwise formed into desired sizes and shapes. As in common practice, the particles are then preferably dried and calcined at a temperature above 900° F.

Although the raw matreials for the catalysts used in my invention may be metallic salts such as nitrates, carbonates, sulfates, phosphates, acetates, and the like, or the metal oxides, or in rare cases the metals themselves, which then may be further converted in the process of catalyst preparation generally to oxides, the ultimate catalytic chemical species which is extant and active in the process of this invention comprises one or more metal sulfides. Conversion to the sulfides is preferably effected ex situ by treating the catalyst preparation after calcination with sulfur-containing compounds such as hydrogen sulfide, mercaptans, or thiophenes, with or without hydrogen. Such conversion may also be effected in the same reactor used for the process of this invention. In some cases, such a pretreatment does not have to be effected since the active catalytic sulfide may be formed by initiating the reaction between the hydrocarbon and elemental sulfur as in the process of this invention. However, in all cases the process is carried out over one or more metallic sulfides which substantially catalyze the desired sulfoxidation reactions.

The hydrocarbon feed for this invention contains at least 50% of ethyl benzene and preferably above 90% of ethyl benzene. In most cases the feed will contain over 98% ethyl benzene, produced by careful fractionation of a C$_8$ aromatic fraction containing xylenes. One of the features of the invention is that high single pass conversions of ethyl benzene can be obtained and in many cases recycle of ethyl benzene is unnecessary. However, in other cases conversion, although high, is not complete, and since the styrene product must be highly purified and must be separated from unconverted ethyl benzene, the small amounts of unconverted ethyl benzene may be recycled.

Elemental sulfur is a standard item of commerce and the net elemental sulfur used in the process of this invention may include any of the grades conveniently available. However, as previously mentioned, it is economically important to reconvert the hydrogen sulfide formed in the sulfoxidation step to elemental sulfur by the additional reaction $$2H_2S + O_2 \rightarrow 2H_2O + S_2 \tag{5}$$

Thus, with reconversion, the process theoretically requires no net feed of elemental sulfur. Actually, however, because of unavoidable losses, a small amount of net elemental sulfur will always be required, the amount depending on various minor and subsidiary aspects of the process and impossible to specify. However, the preferable quantity of elemental sulfur in the total feed to the sulfoxidation step cannot be less than 0.25 mole of S$_2$ per mole of ethyl benzene in the total feed, nor greater than 2.5 moles of S$_2$ per mole of styrene, a range which is necessary to permit an economically significant conversion with minimum formation of undesirable organic sulfur compounds and tar.

Conceivably, a net feed of steam and/or oxygen may be added to the sulfoxidation reactants to produce minor benefits. However, it is emphasized that these components are not necessary to the process of this invention. If they are added, steam and/or oxygen must be added in such quantities so as not to convert the catalytic active components substantially from sulfides to oxides.

As emphasized previously, sulfoxidation reaction temperatures are substantially below those in simple dehydrogenation and generally below those employed by McCullough who did not employ catalytic contact agents. Depending on the catalyst used and on other factors, particularly the composition of the combined feed to the reactor, reaction temperatures may vary from 600° F. to 1100° F., to permit most economic satisfaction of the kinetic and thermodynamic requirements of the reaction. Temperatures of 700° F. to 1000° F. are preferable.

As a further consequence of the use of metallic sulfide catalysts which permit the use of low sulfoxidation reaction temperatures and adiabatic reaction conditions, together with the low endothermic heat requirements of sulfoxidation in general, the feed to the reaction zone does not have to be preheated excessively to obtain high single pass conversions adiabatically. Heat sinks, such as obtained by using large amounts of highly preheated steam, or by cyclic regeneration of the catalyst coke do not have to be provided. Furthermore, no precautions need be taken to avoid mixing of the reactants before entry into the reactor, since at the feed preheat temperature employed, little or no reaction will occur in the absence of catalyst. Thus, the ethyl benzene and elemental sulfur may be preheated separately or together, as is economically desirable.

The contact time in the catalytic reaction zone may vary over rather wide limits depending on catalyst activity, reaction temperature and other reaction variables. However, the contact time will substantially exceed 0.1 second in all cases. Contact times of from 1 to 100 seconds are preferable although still higher contact times may be employed in some cases.

The sulfoxidation reactor pressure is essentially atmospheric, e.g. from 5 p.s.i.a. to 100 p.s.i.a. Pressures below atmospheric are not necessary, nor are pressures substantially above atmospheric required or desirable except for economic design of recovery equipment. Actually, engineering considerations, including the pressure drop across the catalyst bed and recovery equipment, determine to a major extent the average pressure in the reactor.

At these conditions of pressure and temperature, and with the feeds and products specified, the feed and products will be substantially (and, in most cases, all) in the vapor phase. Under these conditions, the catalyst may be employed in any kind of a reactor system suitable for the purpose. These include upshot and downshot fixed beds, moving beds, fluid beds and the like. However, a conventional fixed bed is preferred since the need to transfer heat or regenerate carbon is of minor importance in this invention, and little advantage would be gained from use of the more complex and expensive moving or fluid bed systems. The preferred fixed bed arrangement for the catalyst is obtained using conventional large diameter cylindrical reactors which are simply insulated without the need to transfer heat to or from the reactor. This simple and economic method of containing the catalyst in an adiabatic reactor system is a feature of this invention and is ultimately a consequence of the use of elemental sulfur and a sulfidic catalyst to satisfy the thermodynamic requirements. Thus, in all cases the total reactor feed may be preheated above reaction temperatures without significant decomposition of the reactants, the feed entering the reactor at essentially the preheat temperature and cooling somewhat as it passes through the reactor due to the mild endothermic heat of reaction.

In the process of this invention quenching of the reaction products may or may not be required. When the sulfoxidation reaction is carried out at the lower limits of the temperature range specified, quenching is usually not required since non-catalytic reactions will not occur at any appreciable rate at these temperatures. However, when reaction is carried out at the higher limits of the temperature range specified, quenching of the reactor effluent stream may be desirable. This can be carried out by contacting the reactor effluent gases with any liquid, preferably one available such as elemental sulfur or feed or product hydrocarbons, the amount of the liquid used and its temperature being such as to decrease rapidly the temperature of the effluent to the desired unreactive level.

In the process of this invention, coke yields vary considerably depending on the feed, reaction temperature and pressure, extent of single pass conversion, catalyst and, in fact, on every operating variable. However, coke yields are substantially lower than in simple dehydrogenation processes, so that elaborate regeneration procedures are not required. It may be desirable to regenerate the catalyst periodically however, and this may be accomplished using air, dilute oxygen, oxygen and steam and the like, as conventionally practiced for many other catalytic hydrocarbon conversion processes. After such a regeneration, it may often be necessary to resulfide the catalyst before further use. A more unique regeneration procedure is to use elemental sulfur for regeneration instead of oxygen-containing gases. When elemental sulfur is used, the coke on the catalyst is removed by reaction to produce carbon disulfide. In this case catalyst regeneration is practiced simply by shutting off the hydrocarbon feed, and raising temperature if necessary or desirable; after the desired quantity of catalyst coke is removed, the hydrocarbon feed is simply re-initiated with no resulfiding of the catalyst required.

As previously indicated, an economically important feature of my invention is the conversion of hydrogen sulfide to elemental sulfur designated herein as the reconversion step. Such reconversion may be accomplished by a two-stage process commonly called the Claus process. In the first stage the hydrogen sulfide is burned with air to produce sulfur dioxide at temperatures of between 1300° F. and 3000° F., and in the second stage the sulfur dioxide is catalytically combined with additional hydrogen sulfide at about 500° F. to produce elemental sulfur. Thus, the two-stage reconversion process may be represented by the following equations:

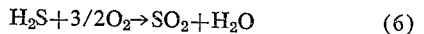

$$H_2S + 3/2 O_2 \rightarrow SO_2 + H_2O \quad (6)$$

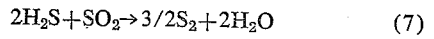

$$2H_2S + SO_2 \rightarrow 3/2 S_2 + 2H_2O \quad (7)$$

Two modifications of this classic process exist, the first modification in which all of the hydrogen sulfide is mixed with an insufficiency of air for entry into the first stage combustion zone, and the second in which only one-third of the hydrogen sulfide is inserted into the first combustion zone, with the remaining two-thirds bypassed to enter the second catalytic zone.

In the process of my invention, where elemental sulfur is a major reactant and hydrogen sulfide a major reaction product, and in which it is economically important to reconvert the hydrogen sulfide to sulfur using the Claus process or modifications thereof, it has been found that the heat released by the highly exothermic reconversion reactions is very valuable for carrying out the sulfoxidation reactions. Both stages of the reconversion process are exothermic, and as noted above, the first stage combustion is carried out at very high temperatures. In conventional Claus process technology, available heat is converted to low and moderate pressure steam. However, in the process of my invention, since the exothermic heat released in the overall reconversion process (a minimum of about 2000 B.t.u. per pound of elemental sulfur produced) fully satisfies the endothermic heat required to carry out the desired reaction (ca 500 B.t.u. per pound of elemental sulfur converted), it is highly advantageous to utilize the heat from the reconversion reactions to preheat the reactants to the sulfoxidation step above the reaction temperature employed in this step, to the extent required to carry out the sulfoxidation reactions adiabatically. Since the first (combustion) stage of the reconversion step is carried out at temperatures of between 1300° F. and 3000° F., and since the sulfoxidation reactions are carried out between 600° F. to 1100° F., not only does the reconversion step provide sufficient quantity of heat, but it provides a completely adequate temperature level. If desirable, both the total quantity of heat and the temperature level may be increased by increasing the quantity of hydrocarbons contained in the hydrogen sulfide fed to the reconversion step; this may be accomplished by using light hydrocarbons produced in the sulfoxidation reactions, which have generally no value other than for fuel.

In most cases it is also desirable to pass small amounts of organic sulfur compounds produced in the sulfoxidation reactions to the reconversion step. Such a practice eliminates the need for disposing of undesirable byproducts, and increases the total heat available and the temperature level of the reconversion step; similarly by this practice, there is little net usage of elemental sulfur in the overall process as previously described.

Utilization of the heat available from the reconversion step may be carried out by various methods known to those skilled in the art. Of considerable importance in this respect is the fact that advances in materials of construction have permitted direct heat exchange to be practiced at temperatures of as high as 1200° F. and in special cases as high as 1500° F. In exchanging the feed components to the sulfoxidation step (generally sulfur and ethyl benzene), it is not desirable to carry hydrocarbon-containing streams to a temperature level above 1200° F., and preferably not above 1100° F., because of thermal decomposition and coking in the exchangers. However, sulfur alone may be preheated to as high a temperature as possible economically without such fear.

In conventional practice of the Claus process, elemental sulfur is a product and is generally separated from the co-produced water (and small amounts of carbon dioxide, sulfur dioxide and unreacted hydrogen sulfide), and from the large quantity of nitrogen residual from the air used in the combustion stage. However, in the process of my invention, the elemental sulfur formed in the reconversion step may be reused directly. Since the water vapor, nitrogen, and traces of sulfur dioxide, carbon dioxide and hydrogen sulfide are not a priori deleterious in the sulfoxidation reactions, it may be advantageous in some cases to pass the total effluent from the reconversion step directly to the sulfoxidation reactor. Such a practice is particularly desirable if it is advantageous to carry out the sulfoxidation at the higher levels of total operating pressure specified in this invention, but to reduce the partial pressures of the reactants. In this case the steam and nitrogen from the reconversion step act as diluents in reducing the partial pressure of the sulfoxidation reactants. Many possibilities exist in this respect, such as for example, removing the steam but not the nitrogen, or vice versa. One interesting possibility is that of using more or less pure oxygen in the reconversion step instead of air. In this case the temperature level of the first (combustion) stage of the reconversion step is considerably raised and, more importantly, there is little or no nitrogen in the reconversion step effluent. Thus, the use of more or less pure oxygen provides an effluent comprised of essentially only elemental sulfur and steam, which then simply provides sulfur with a steam diluent to the sulfoxidation reactions if desirable.

In many cases the reconversion step may be carried out in a system which processes not only hydrogen sulfide from the sulfoxidation reactions, but also hydrogen sulfide from other sources. Such other sources may include other sour gases such as obtained from natural gas processing, petroleum refinery operations and the like, and the use of a single system to convert all sources of hydrogen sulfide to elemental sulfur will have obvious economic advantages. In such cases the small net quantity of elemental sulfur required in my process may be derived in fact from the hydrogen sulfide in the sour extraneous gas, and obviously as well, elemental sulfur may be produced as a net product of the overall system.

Figure 2:
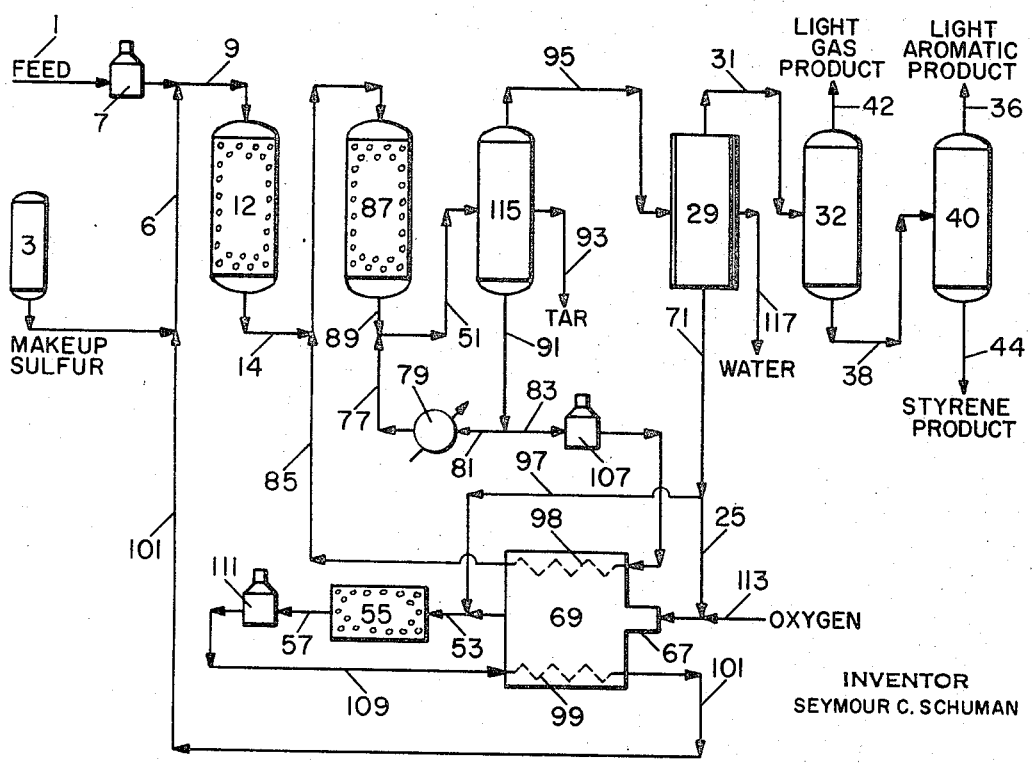

The attached FIGURES 1 and 2 diagrammatically illustrate the sulfoxidation of ethyl benzene, the recovery of the styrene produced, and the reconversion of the hydrogen sulfide also produced to elemental sulfur which is then reused in the sulfoxidation step. FIGURES 1 and 2 are two embodiments of many which are possible and practical and simply serve to further teach how my invention may be practiced; as obvious to those skilled in the art, the optimal use of my invention in any given case will depend on many factors and the following examples are not intended to be restrictive thereof.

FIGURE 1 is an apparatus useful for producing styrene from ethyl benzene with the sulfoxidation reaction carried out at the lower limits of the temperature range specified herein. The hydrogen sulfide produced from the sulfoxidation reaction is passed to a large sulfur production plant used to convert all of the sour gases obtained from a petroleum refinery to elemental sulfur.

Ethyl benzene from a suitable source 1 is passed into preheater 7, and after issuing from 7, this fresh feed stream is combined with a recycle stream issuing from line 49. The latter stream provides all of the elemental sulfur fed to the sulfoxidation reactor as well as recycled ethyl benzene, obtained as will be described. The total feed passes to the reactor through line 9, substantially above the reactor temperature.

The reactor 11 is a simple, insulated, cylindrical vessel containing a catalyst composed of 3% nickel sulfide and 10% molybdenum sulfide supported on activated alumina containing 3% silica. The catalyst is prepared by precipitation of the required quantity of nickel and molybdenum on the alumina gel support, followed by extrusion, calcination, and ex situ sulfidization using hydrogen sulfide at 600° F. The reactor is essentially adiabatic, with no heat transferred to or from it. Thus, the catalyst need not be packed in tubes, and the reactor is simple and inexpensive to build.

The reaction products issue from reactor 11 through line 13 below the temperature of the feed. The products are then cooled below the liquefaction point of elemental sulfur, and unreacted sulfur removed in separator 15. Such elemental sulfur is recycled back to the process through line 17 as will be described. The uncondensed material from separator 15 is further cooled and passes through line 19 to tower 21 to separate out small quantities of low-boiling tar. This tar proceeds from tower 21 to the reconversion step through line 23 as described below. The overhead from separator 21 passes through line 27 into the hydrogen sulfide removal system 29. In this case a conventional diethanolamine system is employed which is shown diagrammatically as a box although it is composed of various components for absorption, stripping, and the like. The stripped hydrogen sulfide issues from the scrubber system through line 71 and is combined with the low-boiling tar to provide the feed to the reconversion step.

The substantially hydrogen sulfide-free product gas passes from the hydrogen sulfide removal system through line 31, and is then cooled and passes to fractionation tower 33. The bottoms from the tower 35 is substantially product styrene. After further cooling the overhead from tower 33 passes through line 37 into tower 39 from which unreacted ethyl benzene is removed at 43. A small amount of lighter hydrocarbons is taken overhead from tower 39 as a co-product through line 41. The ethyl benzene is recycled back to reactor 11 as will be described.

If desirable, the styrene product at 35 may be further purified, usually by fractional distillation, to remove impurities which may be deleterious in derivative polymerization operations.

The hydrogen sulfide and tar produced from the sulfoxidation reaction proceed through line 25 to the reconversion step. As indicated above, such reconversion is in this case carried out in a large Claus plant which processes all of the sour gas in a petroleum refinery. This plant converts all such sour gas to elemental sulfur which is marketed or converted to sulfuric acid or the like; however, in this case it also reconverts hydrogen sulfide and tar from the sulfoxidation to elemental sulfur which is reused in the sulfoxidation reaction, and it supplies the small net amount of elemental sulfur to the sulfoxidation step which replaces the corresponding amount of sulfur lost as hydrogen sulfide and carbon disulfide in lines 41 and 61. In FIGURE 1, the hydrogen sulfide and tar from the sulfoxidation pass through line 25, join the main stream of hydrogen sulfide from the refinery sour gases issuing from 3, then mix with the requisite amount of air from 27, and enter the Claus burner 67. After reaction, the burner effluent is cooled in exchanger 69 and then passes through line 53 to the second reconversion stage 55 as practiced conventionally. The effluent from this stage issues through line 57 into tower 59 where elemental sulfur is separated from nitrogen and steam; the latter are vented through line 61.

The sulfur withdrawn from separator 59 to be used in the sulfoxidation step proceeds through line 63, mixes with sulfur from line 17 and passes through line 65 to join the stream of unconverted ethyl benzene from 43, the latter previously vaporized in heater 73. The combined stream enters exchanger 69 through line 45, and is exchanged against the sensible heat of the first stage reconversion step vapors. The exchanger is shown schematically with the recycle stream in the tube side 47, and the reconversion step vapors in the shell side of 69. The exchange heats the recycle stream to a temperature level substantially above the average temperature in reactor 11. From the exchanger the recycle stream passes through line 49 and ultimately enters reactor 11 through line 9.

Elemental sulfur, substantially corresponding in quantity to the hydrogen sulfide fed at 3, but slightly less due to the small net utilization in the sulfoxidation process, is withdrawn at 75.

FIGURE 2 illustrates a useful embodiment of this invention to produce styrene from ethyl benzene at the higher temperature limits of the range specified herein. A two-stage reactor system is employed, and conversions of ethyl benzene are sufficiently high that recycle of unconverted ethyl benzene need not be practiced.

Ethyl benzene and a small quantity of make-up sulfur are fed to the reactor 12 through storage tanks, heaters, and lines as shown in 1, 3, 6, 7, and 9. This stream of fresh feed is joined with a stream issuing from the reconversion step from line 101 obtained as will be described. The combined feed enters the two-stage reaction system.

Reactor 12 is again a simple, adiabatic cylindrical vessel containing catalyst as previously described for FIGURE 1. The catalyst in this stage is prepared by co-precipitating equal quantities by weight of the sulfides of iron and manganese by passing hydrogen sulfide through solutions of the salts. The sulfide composite is then dried, a small quantity of binder added, and the total mass then pelleted to 3/16 inch diameter pellets, and finally calcined at 1000° F. in a nitrogen atmosphere. The catalyst thus prepared is composed of metal sulfides and requires no further treatment before use. The total feed enters reactor 12 through line 9, and is removed through line 14, substantially reacted and at a lower temperature than the feed.

The first stage effluent mixes with additional elemental sulfur obtained as will be described from line 85 and then enters the second stage reactor. This reactor is also a simple, cylindrical vessel containing catalyst, and the reaction in this stage is also carried out adiabatically. The second-stage catalyst is composed of 0.05% palladium on silica gel, and is prepared by simple impregnation of 1/8 inch silica gel beads. The catalyst is reduced by treatment with hydrogen for thirty minutes at 850° F. before charging to the second-stage reactor. When the unit is brought on stream as in the process of this invention, the sulfoxidation reactions occurring in the first-stage produce hydrogen sulfide, which when passed to the second stage, rapidly converts the palladium in this stage to a sulfide which is then effective to complete the desired sulfoxidation reactions.

The reaction products, containing only small quantities of unreacted ethyl benzene, issue through line 89 and are quenched by a sulfur stream from line 77. The quenched product stream flows through line 51 into separator 115 where tar, miscellaneous sulfur compounds and elemental sulfur are removed, the gaseous products proceeding overhead from the separator. In this case, tar and organic sulfur compounds are removed as by-products through line 93. The elemental sulfur is removed from the bottom of the separator through line 91. Part of this sulfur is passed through line 81, is cooled in exchanger 79, and passes through line 77 to provide the reactor effluent quench. The remainder issues through line 83, is vaporized by heater 107 and then passes through tubes 98 to exchange with the first-stage reconversion gases, and then through line 85 to provide the additional sulfur fed to the second stage reactor 87. Thus, in this case the overall excess of sulfur used in the sulfoxidation reaction is recycled to the second stage reactor only.

The overhead from the primary separator 115 proceeds through line 95 into the hydrogen sulfide absorption system 29 which scrubs out hydrogen sulfide as described for FIGURE 1. The unabsorbed hydrocarbon gases leave the hydrogen sulfide absorption system through line 31, are cooled to liquefy styrene and passed into tower 32. The uncondensed, light gas product is removed at 42, and styrene together with small quantities of unreacted ethyl benzene and somewhat lighter aromatic hydrocarbons are passed into tower 40. From this tower, the lighter aromatics are obtained as a product overhead at 36, and the styrene removed at 44. The total quantity of ethyl benzene in the light aromatic product removed at 36 is insufficient to warrant separation and recycle; thus, this product may be simply blended into gasoline or used advantageously in some other way.

The reconversion system shown in FIGURE 2 is a "by-pass" system in which one-third of the hydrogen sulfide is fed to the first (combustion) stage through line 25, with the other two-thirds fed to the lower temperature catalytic chamber through line 97 as dictated by the stoichiometric requirements of the system. In this case 95% oxygen is used in the first (combustion) stage supplied through line 113. The oxygen and hydrogen sulfide are burned in chamber 67 and then exchanged with two other streams in exchanger 69. One of the exchanged streams is the unreacted vaporized sulfur as described previously. The second stream is the total effluent from the reconversion step to be subsequently described.

After leaving exchanger 69, the combustion gases mix with additional hydrogen sulfide from line 97 and enter the catalytic chamber through line 53. The catalytic chamber 55 is a more or less conventional second stage Claus reactor, but is somewhat smaller and more economically designed because of the use of 95% oxygen instead of air for the combustion step.

In this case the products leaving the second stage of the reconversion step comprise essentially sulfur and water, with small quantities of nitrogen and argon which exist as impurities of the oxygen used for the combustion, and some unreacted hydrogen sulfide and sulfur dioxide. These proceed through line 57 to heater 111 without separation of sulfur, and then through line 109 after which they are exchanged in tubes 99 against the combustion gases in exchanger 69. The heated stream issues from the exchanger through line 101 and is then passed without further heating back to the sulfoxidation reactor stages. Thus, in this case the reconverted sulfur is recycled back to the sulfoxidation step together with steam, the latter ultimately eliminated at 117.

*Example 1*

All quantities are converted to the basis of 1000 pounds of ethyl benzene feed.

The process to produce styrene is carried out as in FIGURE 1. For simplicity, the fresh feed is assumed to contain no xylenes or other impurities small quantities of which may be present in a commercial ethyl benzene feed. The fresh feed leaves heater 7 at a temperature of 690° F. The temperature of the total recycle stream (consisting of unconverted elemental sulfur, elemental sulfur obtained from the hydrogen sulfide reconversion, and unconverted hydrocarbons substantially ethyl benzene) in the feed line 49 is 980° F. The combined feed enters the reactor 11 at 830° F. The average temperature in reactor 11 is about 775° F., and the products leave the reactor at 725° F.

The average pressure in reactor 11 is 20 p.s.i.a. The composition of the various streams at various points of the process is provided in Table 1. These quantities illustrate that using the process of this invention, it is possible to convert ethyl benzene to styrene with higher single pass conversion (and concomitantly much lower recycle) and better selectivity than obtained in conventional processing technology. Large quantities of steam are not required for dilution or as a heat sink. Net sulfur utilization is small, and advantageous use is made of a large Claus plant common to several other refinery operations to preheat the sulfoxidation recycle components to the desired reactor inlet temperature to carry out the sulfoxidation adiabatically at relatively low reaction temperatures and to supply the small net amount of sulfur required in the sulfoxidation reaction.

*Example 2*

All quantities are converted to the basis of 1000 pounds of ethyl benzene fresh feed. Again, although xylenes may be present in the ethyl benzene feed, they are ignored to avoid needless complications in the example.

Example 2 serves to illustrate the use of a process system such as that in FIGURE 2. The ethyl benzene feed is converted single pass using two reactor stages with additional elemental sulfur fed between stages.

As indicated in FIGURE 2, the reactor system is again adiabatic. A sulfur quench is employed. Tar is in this case removed as a product. The reconversion step is a "by-pass" system and in this case uses oxygen instead of air. Elemental sulfur and water produced in the reconversion step are passed directly back to the sulfoxidation reactor without separation.

The average pressure in the sulfoxidation reactors is 55 p.s.i.a. The hydrocarbon feed is heated by 7 to 975° F. After admixture with the recycle stream from 101, the combined feed at 9 is 1070° F. After carrying out the first stage reactions adiabatically, the products leave this stage at 950° F. The additional sulfur added through line 85 raises the temperature of the stream to 965° F., and after passing through the second stage, the products are ultimately obtained at 925° F. They are quenched to 350° F. as shown in FIGURE 2. Exchange of the reconversion step product gases against the first stage of the Claus system brings the gases to 1480° F. Such advantageous utilization of the available process heats permits obtaining a combined feed stream at 9 of 1070° F. as described, without excessively preheating the ethyl benzene in fired furnaces with the deleterious results usually encountered therefrom.

Table 2 illustrates material balance quantities and compositions extant at various points of the process system. A high yield of styrene is attained without recycle of unconverted ethyl benzene. The higher total pressures employed result in a much more economic system than that in conventional process technology. Large quantities of steam are not employed, and the small quantity utilized in this case is advantageously obtained from the reconversion step.

TABLE A.—THERMODYNAMICS OF THE CONVERSION OF ETHYL BENZENE TO STYRENE

[Simple dehydrogenation]

| Temperature, °F. | Equilibrium Conversion to Styrene | |
|---|---|---|
| | 1 atm. | 0.1 atm. |
| 800 | 7 | 16 |
| 900 | 13 | 43 |
| 1,000 | 24 | 64 |
| 1,100 | 41 | 80 |

Heat required: 515 B.t.u. per pound styrene

[Sulfoxidation with 100% excess of sulfur]

| Temperature, °F. | Equilibrium Conversion to Styrene | |
|---|---|---|
| | 1 atm. | 0.1 atm. |
| 700 | 96 | 98.5 |
| 1,100 | >99 | >99 |

Heat required: 145 B.t.u. per pound styrene

I claim:

1. The process of contacting ethyl benzene with elemental sulfur adiabatically over a solid catalyst comprising a metallic sulfide at a temperature between about 600° F. and 1100° F. and recovering styrene from the effluent from said reaction zone.

2. The process of claim 1 in which the reaction is carried out at a pressure between 5 and 100 p.s.i.a.

3. The process of claim 1 in which the contact time in the reaction zone substantially exceeds 0.1 second.

4. The process of claim 1 in which the quantity of elemental sulfur in the total feed to the reaction zone corresponds to between 0.25 and 2.5 moles of $S_2$ per mole of ethyl benzene in said total feed.

5. The process of claim 1 in which said reactants are mixed prior to entry to the reaction zone and the reaction is carried out between about 700° F. and 1000° F.

6. The process of claim 1 in which the catalyst is disposed in a fixed, foraminous bed.

7. The process of claim 1 in which the catalyst comprises a metallic sulfide disposed on a substantially inert support.

8. The process of claim 1 in which the reaction is carried out single pass.

9. The process of claim 1 in which the reaction is carried out in the absence of added quantities of steam.

10. An oxidative process comprising (a) contacting ethyl benzene with elemental sulfur adiabatically in an endothermic reaction over a solid catalyst comprising a metallic sulfide at a temperature between about 600° F. and 1100° F. to produce styrene and hydrogen sulfide, (b) contacting said hydrogen sulfide with an oxygen-containing gas in a second, exothermic reaction step to produce elemental sulfur, and (c) removing styrene from the effluent of the first said reaction zone.

11. The process of claim 10 in which the first-said reaction is carried out at a pressure between 5 and 100 p.s.i.a.

12. The process of claim 10 in which the contact time in the first-said reaction zone substantially exceeds 0.1 second.

13. The process of claim 10 in which the quantity of elemental sulfur in the total feed of the first-said reaction zone corresponds to between 0.25 and 2.5 moles of $S_2$ per mole of ethyl benzene in said total feed.

14. The process of claim 10 in which the reactants to the first-said reaction zone are mixed prior to entry to the reaction zone and the reaction is carried out between about 700° F. and 1000° F.

TABLE 1.—PROCESS QUANTITIES AND YIELDS FROM EXAMPLE 1

| | $C_8H_{10}$ | $C_8H_8$ | Light Arom. | $S_2$ | $H_2S$ | Gas | Tar |
|---|---|---|---|---|---|---|---|
| Fresh feed to heater 7 | 1,000 | | | | | | |
| Net hydrogen sulfide utilized from 3 | | | | | 19 | | |
| Hydrocarbon recycle from 43 | 840 | | 6 | | | | |
| Unconverted sulfur recycle from 17 | | | | 306 | | | |
| Reconverted sulfur recycle from 63 | | | | 274 | | | |
| Total feed to reactor 11 | 1,840 | | 6 | 580 | | | |
| Total product from reactor 11 | 840 | 923 | 45 | 306 | 289 | 9 | 14 |
| Yields per 1,000 pounds fresh feed | | 923 | 39 | | | 9 | |

TABLE 2.—PROCESS QUANTITIES AND YIELDS FROM EXAMPLE 2

| | $C_8H_{10}$ | $C_8H_8$ | Light Arom. | $S_2$ | $H_2S$ | Gas | Tar | $O_2$ | $N_2$ | $H_2O$ |
|---|---|---|---|---|---|---|---|---|---|---|
| Fresh feed to reactor 12 | 1,000 | | | 4 | | | | | | |
| Reconverted sulfur stream in 109 and 101 | | | | 272 | 45 | | | | 7 | 153 |
| Total feed to reactor 12 | 1,000 | | | 276 | 45 | | | | 7 | 153 |
| Additional feed to reactor 87 | | | | 218 | | | | | | |
| Total product from reactor 87 | 59 | 874 | 41 | 218 | 334 | 7 | 6 | | 7 | 153 |
| Hydrogen sulfide to 67 | | | | | 111 | | | | | |
| Hydrogen sulfide to 55 | | | | | 222 | | | | | |
| High purity oxygen to 67 | | | | | | | | 136 | 7 | |
| Yields per 1,000 pounds fresh feed | 59 | 874 | 41 | | | 7 | 6 | | | |

15. The process of claim 10 in which the catalyst in the first-said reaction zone is disposed in a fixed, foraminous bed.

16. The process of claim 10 in which the catalyst in the first-said reaction zone comprises a metallic sulfide disposed in a substantially inert support.

17. The process of claim 10 in which the first-said reaction is carried out single pass.

18. The process of claim 10 in which the first-said reaction is carried out in the absence of steam added from an external source.

19. The process of claim 10 in which a substantial part of the sulfur produced in the second step is utilized as feed to the first-said reaction zone.

20. The process of claim 19 in which a substantial portion of the heat released in the second step is utilized to preheat the reactants to the first-said reaction zone.

References Cited

UNITED STATES PATENTS

| 1,997,967 | 4/1935 | Gibbons et al. | 260—669 |
| 2,253,934 | 8/1941 | Harris | 260—669 |
| 2,392,289 | 1/1946 | McCullough et al. | 260—669 |
| 2,441,095 | 5/1948 | Cheney et al. | 260—669 |

DELBERT E. GANTZ, *Primary Examiner.*

C. R. DAVIS, *Assistant Examiner.*